(12) United States Patent
Dutta

(10) Patent No.: US 6,381,289 B1
(45) Date of Patent: Apr. 30, 2002

(54) DEMODULATION METHOD IN HIGH SPEED ASYNCHRONOUS TIME DIVISION MULTIPLEXED PACKET DATA TRANSMISSION

(75) Inventor: Santanu Dutta, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/145,105

(22) Filed: Sep. 1, 1998

(51) Int. Cl.[7] ................................................ H03D 3/00
(52) U.S. Cl. ........................................ 375/335; 455/426
(58) Field of Search ................................. 375/335, 316, 375/295, 303, 362, 365; 370/350, 312, 238.6, 324, 319, 344, 431, 432, 464, 471, 473, 509, 512; 455/412, 426, 463, 38.1, 13.2, 38.3, 515, 427, 458; 340/825.44, 825.73

(56) References Cited

U.S. PATENT DOCUMENTS

| | | | |
|---|---|---|---|
| 4,389,644 A | | 6/1983 | Abiko et al. |
| 5,060,266 A | | 10/1991 | Dent |
| 5,091,942 A | | 2/1992 | Dent |
| 5,148,485 A | | 9/1992 | Dent |
| 5,282,250 A | | 1/1994 | Dent et al. |
| 5,390,245 A | | 2/1995 | Dent et al. |
| 5,408,237 A | * | 4/1995 | Patterson et al. ............ 342/354 |
| 5,450,071 A | * | 9/1995 | DeLuca et al. ......... 340/825.44 |
| 5,539,730 A | | 7/1996 | Dent |
| 5,548,813 A | | 8/1996 | Charas et al. |
| 5,552,779 A | * | 9/1996 | Gaskill et al. ......... 340/825.44 |
| 5,555,257 A | | 9/1996 | Dent |
| 5,559,886 A | | 9/1996 | Dent et al. |
| 5,566,168 A | | 10/1996 | Dent |
| 5,568,088 A | | 10/1996 | Dent et al. |
| 5,574,967 A | | 11/1996 | Dent et al. |
| 5,583,562 A | | 12/1996 | Birch et al. |
| 5,594,941 A | | 1/1997 | Dent |
| 5,600,629 A | | 2/1997 | Van Daele et al. |
| 5,619,210 A | | 4/1997 | Dent |
| 5,619,503 A | | 4/1997 | Dent |
| 5,638,024 A | | 6/1997 | Dent et al. |
| 5,736,934 A | * | 4/1998 | Nozawa et al. ......... 340/825.44 |
| 5,736,959 A | | 4/1998 | Patterson et al. |
| 5,757,782 A | * | 5/1998 | Gaskill ........................ 370/313 |
| 5,903,653 A | * | 5/1999 | Ross et al. ..................... 380/49 |
| 5,905,443 A | * | 5/1999 | Olds et al. ............. 340/825.21 |
| 5,963,846 A | * | 10/1999 | Kurby ........................ 455/12.1 |
| 5,974,032 A | * | 10/1999 | Snowden .................... 370/316 |
| 6,006,068 A | * | 12/1999 | Elkin et al. ................. 455/31.3 |
| 6,097,933 A | * | 8/2000 | Bennett et al. ............ 455/38.3 |
| 6,108,486 A | * | 8/2000 | Sawabe et al. ............... 386/98 |
| 6,128,488 A | * | 10/2000 | Sauvageot et al. .......... 455/428 |

FOREIGN PATENT DOCUMENTS

WO    WO 97/21282    6/1997

* cited by examiner

Primary Examiner—Chi Pham
Assistant Examiner—Emmanuel Bayard
(74) Attorney, Agent, or Firm—Coats & Bennett, P.L.L.C.

(57) ABSTRACT

A method of demodulating a communication signal is provided. The communication signal includes a plurality of pages with each page having a plurality of addresses and corresponding data packets. The demodulating method includes the steps of receiving the communication signal at a user terminal, identifying which of the plurality of pages are destined to the receiving user terminal, identifying which of the plurality of data packets within the identified page are destined to the receiving user terminal, and demodulating only the data packets identified as being destined to the receiving user terminal.

38 Claims, 8 Drawing Sheets

DEMODULATION METHOD IN HIGH SPEED ASYNCHRONOUS TIME DIVISION MULTIPLEXED PACKET DATA TRANSMISSION

FIELD OF THE INVENTION

The present invention is directed toward a method for demodulating high speed asynchronous time division multiplexed signals and, more particularly, toward a method for demodulating high speed frameless asynchronous time division multiplexed signals.

BACKGROUND OF THE INVENTION

In wireless communication systems utilizing low Earth orbiting satellites, where data packet switching is employed and Time Division Multiplexing is the selected mode of downlink access, it is advantageous to use a small number of broadband carriers in the downlink, as opposed to a large number of narrow band carriers. This means that the data packets destined for a multiplicity of Earthbound user terminals are time multiplexed into a single broadband, high data rate carrier. However, the data demodulation rate at an individual user terminal may be desired to be much smaller than the carrier data rate, also referred to as the bearer data rate, to reduce demodulator complexity and cost. For example, an exemplary bearer data rate may be 450 Mbits/sec, where an exemplary demodulation rate at an individual user terminal may be 2 Mbits/sec.

Also, as modern satellite communication systems are increasingly becoming cellular in character, the satellites, via high gain antennas, are generating narrow beams, also referred to as "spot beams" and creating small cells on the Earth. In a given satellite footprint, or useful field of view of the Earth from the satellite, there may typically be 360 cells. However, unlike conventional terrestrial cellular communication systems, a satellite communication system may not have all 360 downlink beams active at all times; this would require the generation of 360 simultaneous transmit spot beams and would place a great complexity/cost burden on the satellite payload. To mitigate this problem, a satellite communication system may employ cell hopping by transmitting fewer beams than the number of cells in a satellite's footprint. Typically, the number of hopping beams might be 24 for the above example of 360 cells in a given footprint.

The capacity of a hopping downlink beam to deliver traffic to a cell is directly proportional to its dwell time at the cell: CAPACITY=(BEARER DATA RATE) (DWELL TIME). As shown in FIGS. 1a–b, in conventional, or synchronous, TDM (Time Division Multiplexed) systems, the time domain is divided into fixed-length/fixed-boundary frames 10, which are further subdivided into fixed-length/fixed-boundary slots 12 and sub-slots 14. If cell hopping were employed in a conventional TDM system, cells 1-n would typically be visited with some fixed periodicity with respect to the frame 10, e.g., once per frame (see FIG. 1a), and the dwell period at a cell ($T_{slot}$) would typically be synchronized to the slot 12. Within a given slot 12, capacity is allocated to different receivers 1-k by allocating a fixed sub-slot 14 to a given receiver 1-k (see FIG. 1b), with the dwell period at a receiver ($T_{subslot}$) synchronized to the subslot 14. The capacity allocation is made on a demand-assigned basis through a call set-up protocol, which is relatively time consuming and inflexible.

In the conventional, i.e., synchronous, TDM system described above with respect to FIGS. 1a–b, all cells 1-n have the same dwell time $T_{slot}$ and the cell visits, i.e., slots 12, occur at times known a priori to the receivers 1-k in each cell 1-n. Variations, still within the commonly accepted definition of a synchronous TDM system, may exist as follows: (a) some cells may have different visitation periods than others, e.g., twice a frame or once every two frames; (b) the slot 12 durations may have non-uniform but fixed lengths; or (c) more than one subslot 14 may be allocated to a receiver. The distinguishing feature of a synchronous TDM system is that by acquiring time synchronization to the system clock, a receiver in any cell has accurate knowledge of the time when it will be accessed.

In synchronous TDM systems, once capacity is allocated to a receiver, it cannot be rapidly redeployed. If the receiver does not use the allocated capacity, it is wasted. Accordingly, modern broadband systems offering bandwidth on demand services tend to favor Asynchronous TDM (ATDM) where the dwell times at a cell and the access times to a given receiver can be dynamically changed without notifying the receiver. Thus, ATDM systems alleviate the overhead and delay of call set-up required in a synchronous demand-assigned TDM system.

ATDM systems belong to one of two categories; framed and unframed. As shown in FIGS. 2a–c, in a framed ATDM system, although there is a fixed-length/fixed-boundary frame 10 and slot 12-structure (see FIG. 2a), the downlink beam hops between cells 1-k within a given slot 12 (see FIG. 2b). In framed ATDM, only cells that have packets to be delivered are visited by the beam, and the dwell time ($T_{burst}$) at each cell 1-k is just sufficient to deliver the packets destined for that particular cell 1-k. The cells that can potentially be visited in a given slot 12 are predetermined, but not all cells are necessarily visited in every slot 12; a cell being visited only if there are packets to be delivered. Thus, the cells visited in a particular slot 12 comprise a random subset of a fixed set of cells. As a consequence of the random visitation times, the start and end times of an access ($T_{burst}$) to a cell are also random. However, the access to a given cell always occurs within a predetermined fixed-length/fixed-boundary slot 12 ($T_{slot}$)

Within the access to a particular cell, $T_{burst}$, random numbers of packets are transmitted to random numbers of receivers 1-k, or user terminals (FIG. 2c). The flexible bandwidth on-demand feature of ATDM systems stems from the fact that the mean data rate to a given terminal is proportional to the mean number of packets transmitted to the terminal in unit time, with the number of packets transmitted to the terminal capable of being changed dynamically without the cooperation, or prior knowledge, of the receiver. Thus, the data rate, or bandwidth, to a given terminal can increased by simply increasing the number of packets transmitted to the terminal in each access ($T_{rx}$) and/or increasing the visitation rate to the cell containing the terminal.

One of the limitations of a framed ATDM system, is that the slot length $T_{slot}$ limits the capacity peak density that can be created on the ground. As the slot length $T_{slot}$ is fixed, it limits the maximum dwell time $T_{burst}$ on the busy cells, since the dwell time $T_{burst}$ on a given cell cannot exceed the slot time $T_{slot}$. On the other hand, if the capacity demand on the ground is highly non-uniform, in some slots there will be idle time after all cells in the slot have been visited leading to capacity wastage. Therefore, in order to achieve operational flexibility in creating capacity peak densities, some broadband satellite systems are opting for frameless ATDM, where all time limitations of the frame and slot are eliminated.

FIGS. 3a–b illustrate the "point and shoot" access to user terminals in a frameless ATDM system. Both the cell revisit time $T_{revisit}$ and the cell dwell time $T_{cell}$ of the downlink burst are random. Further, there is no fixed association between a hopping beam and a cell, ie., a cell may be visited by any available hopping beam, although this is not explicitly shown in FIG. 3.

In the above-described synchronous TDM and framed ATDM systems, specific beams were assigned to specific cells, However, which beam visits a cell to deliver a packet is not of great importance in terminal design; what is important is the degree of time predictability of the burst, which is tabulated below.

TABLE 1

Time Predictability of Different Access Schemes

| Access Scheme | Burst Dwell Time at Cell | Cell Revisit Time |
| --- | --- | --- |
| Synchronous TDM | Known Exactly | Known Exactly |
| Framed ATDM | Known to be within a slot whose time of occurrence is known exactly | Known to within a frame period ± half a slot period |
| Frameless ATDM | Completely unknown | Completely unknown |

In frameless ATDM systems, a buffer of packets is maintained in the satellite for each cell in its footprint. Packets uplinked to the satellite from the Earth, or forwarded from other satellites in a multi-satellite system with cross-links, are queued in the buffers waiting to be downlinked to specific terminals in known cells. Based on a packet discharge algorithm, the packets are downloaded to Earth-based terminals in a cell at random firing times and with random dwell times. For example, when the satellite buffer is sufficiently close to being full, or when the packets have been held for a predetermined maximum length of time, a beam is pointed to a particular cell and all packets in the buffer directed to that cell are delivered; higher priority packets will be subject to less queuing delay than lower priority packets. By virtue of framelessness, the flexibility of assigning beams to cells is maximized. A key aspect of the discharge algorithm in frameless ATDM systems is at the start and end times of the download, or access $T_{cell}$, are completely unconstrained.

Prior art receiver demodulators for frameless ATDM are generally constructed according to one of the following forms: (a) real time demodulation of all data packets in a burst at the bearer data rate, followed by address based selection of the receiver's own packets; or (b) non-real-time demodulation of the receiver's own data packets plus some overhead bits at a rate lower than the bearer data rate. Real time demodulation will require the receiver to have a demodulator operating at the bearer data rate. Since the bearer data rate is generally high, e.g., 450 Mbits/sec, a receiver demodulator would be required to have a 450 Mbits/sec demodulator. This sets the complexity and cost of the demodulator at the receiver at a high level.

Non-real-time demodulation requires the receiver to store the received burst at the bearer data rate, and then read the burst out of memory for demodulation at the generally lower end-user data rate. However, if the receiver begins storing signal samples in its memory upon the detection of a burst, since the end time of an access burst in frameless ATDM is indeterminate, bounded possibly by the queue buffer size in the satellite payload, the signal memory in the receiver terminal would have to be at least as large as the queue buffer in the satellite payload, multiplied by the A/D converter resolution which, in a typical implementation, is in the range of 4–8. This would necessitate the use of very large signal storage memories and would be expensive for a low cost, low data rate terminal.

The present invention is directed toward overcoming one or more of the above-mentioned problems.

SUMMARY OF THE INVENTION

A method of demodulating a communication signal is provided according to the present invention. The communication signal includes a plurality of pages with each page having a plurality of addresses and corresponding data packets. The demodulating method includes the steps of receiving the communication signal at a user terminal, identifying which of the plurality of pages are destined to the receiving user terminal, identifying which of the plurality of data packets within the identified page are destined to the receiving user terminal, and demodulating only the data packets identified as being destined to the receiving user terminal.

In one aspect of the present invention, each of the plurality of pages is preceded by a page header indicative of page number. The step of identifying which of the plurality of pages are destined to the receiving user terminal includes the step of detecting which of the plurality of page numbers, corresponding to the plurality of pages, matches the receiving user terminal page number.

In another aspect of the present invention, the page header includes an MFSK (Multiple Frequency Shift Keying) signal having a plurality of center frequencies with each page number represented by a unique sequence of MFSK symbols. The step of detecting which of the plurality of page numbers, corresponding to the plurality of pages, matches the receiving user terminal page number includes the step of filtering the communication signal using a set of narrow bandpass filters having center frequencies corresponding to the unique MFSK center frequencies, followed by energy detection.

In another aspect of the present invention, the step of identifying which of the plurality of data packets within the identified page are destined to the receiving user terminal includes the steps of demodulating the plurality of addresses in the identified page, and detecting which of the plurality of addresses within the identified page matches the receiving user terminal address.

In another aspect of the present invention, the demodulating method further includes the steps of writing the identified page to a memory in the receiving user terminal, and reading the identified page from the memory for demodulation.

In another aspect of the present invention, the step of writing the identified page to a memory in the receiving user terminal includes the steps of writing the plurality of addresses in the identified page to a first memory in the receiving user terminal, and writing the plurality of data packets in the identified page to a second memory in the receiving user terminal. The plurality of addresses in the identified page and the data packets identified as being destined to the receiving user terminal are read out of the first and second memories, respectively, for demodulation.

In another aspect of the present invention, the communication signal is transmitted at a first rate, the data packets identified as being destined to the receiving user terminal are demodulated at a second rate, and the plurality of addresses in the identified page are demodulated at a third rate less than the first rate but greater than the second rate.

In another aspect of the present invention, the communication signal is transmitted at a first rate, and the data packets identified as being destined to the receiving user terminal are demodulated at a second rate less than the first rate.

In another aspect of the present invention, the first rate is approximately 450 Mbits/sec, the second rate is approximately 2 Mbits/sec, and the third rate is approximately 5.7 Mbits/sec.

In another aspect of the present invention, the communication signal is transmitted from an Earth-orbiting satellite.

In another aspect of the present invention, the communication signal includes an ATDM (Asynchronous Time Division Multiplexed) signal.

In another aspect of the present invention, the plurality of addresses and corresponding data packets are arranged by grouping the plurality of addresses together followed by the plurality of data packets.

In another aspect of the present invention, the plurality of addresses and corresponding data packets have a one-to-one correspondence.

In another aspect of the present invention, user terminals having low data demodulation rates are grouped into common pages.

In another aspect of the present invention, the page header includes an analog signal. The step of identifying which of the plurality of pages are destined to the receiving user terminal includes the step of detecting a presence of energy in the page header, the detection of energy indicating identification of a page destined to the receiving user terminal.

In another aspect of the present invention, the step of detecting a presence of energy in the page header includes the step of filtering the communication signal using a narrow bandpass filter.

An alternative method of demodulating a communication signal received at a user terminal is provided according to the present invention.

The communication signal includes a plurality of pages, each page having a preamble having a page header indicative of page number followed by a synchronization word, and a plurality of addresses and corresponding data packets. The alternative demodulating method includes the steps of identifying which of the plurality of pages are destined to the receiving user terminal, comparing the synchronization word with a matched filter at the receiving user terminal to confirm page identification, identifying, upon confirmation of page identification, which of the plurality of data packets within the identified page are destined to the receiving user terminal, and demodulating only the data packets identified as being destined to the receiving user terminal.

In one aspect of the alternative form of the present invention, the step of identifying which of the plurality of data packets within the identified page are destined to the receiving user terminal includes the steps of demodulating the plurality of addresses in the identified page, and detecting which of the plurality of addresses within the identified page matches the receiving user terminal address.

In another aspect of the alternative form of the present invention, the demodulating method further includes the steps of writing the identified page to a memory in the receiving user terminal, and reading the identified page from the memory for demodulation.

In another aspect of the alternative form of the present invention, the step of writing the identified page to a memory in the receiving user terminal includes the steps of writing the synchronization word and the plurality of addresses in the identified page to a first memory in the receiving user terminal, and writing the plurality of data packets in the identified page to a second memory in the receiving user terminal. The synchronization word and the plurality of addresses in the identified page and the data packets identified as being destined to the receiving user terminal are read out of the first and second memories, respectively, for matched filtering and demodulation.

It is an object of the present invention to provide a method of demodulation for high speed frameless ATDM packet data while reducing the complexity and the power dissipation of the demodulator at the user terminal.

It is a further object of the present invention to provide a method of demodulation for high speed frameless ATDM packet data while reducing the complexity and the power dissipation of the demodulator at the user terminal so as to approach those of a demodulator that continuously demodulates only its own data.

It is a further object of the present invention to provide a demodulation system capable of demodulating high speed frameless ATDM packet data while maintaining a reduction in the complexity and power dissipation of the demodulator at the user terminal so as to approach those of a demodulator that continuously demodulates only its own data, and not data destined for another user terminal.

It is yet a further object of the present invention to reduce the complexity of a non-real-time demodulator for frameless ATDM packet data.

It is still a further object of the present invention to provide a method of demodulation for high speed frameless ATDM packet data while restricting the size of the signal storage memory at the user terminal and decoupling it from the size of the data buffer in the satellite payload and, consequently, the burst length.

Other aspects, objects and advantages of the present invention can be obtained from a study of the application, the drawings, and the appended claims.

DETAILED DESCRIPTION OF THE PREFERRED EMBODIMENT

In wireless communication, e.g., from an Earth-orbiting satellite to an Earthbound user terminal, or between distant Earthbound user terminals, data packets for several user terminals are time multiplexed together and transmitted at a generally high bit rate, which may approximate 450 Mbits/sec. The data packets include all the information which is to be sent to various user terminals, with each data packet containing a corresponding address of a user terminal where it is to be transmitted. In an exemplary form, the addresses and corresponding data packets are multiplexed together and transmitted at a generally high bit rate of approximately 450 Mbits/sec. It should be understood that the reference herein to a 450 Mbits/sec transmission rate is meant for illustrative purposes only, and is not meant to impose any limitations.

Figure 1:
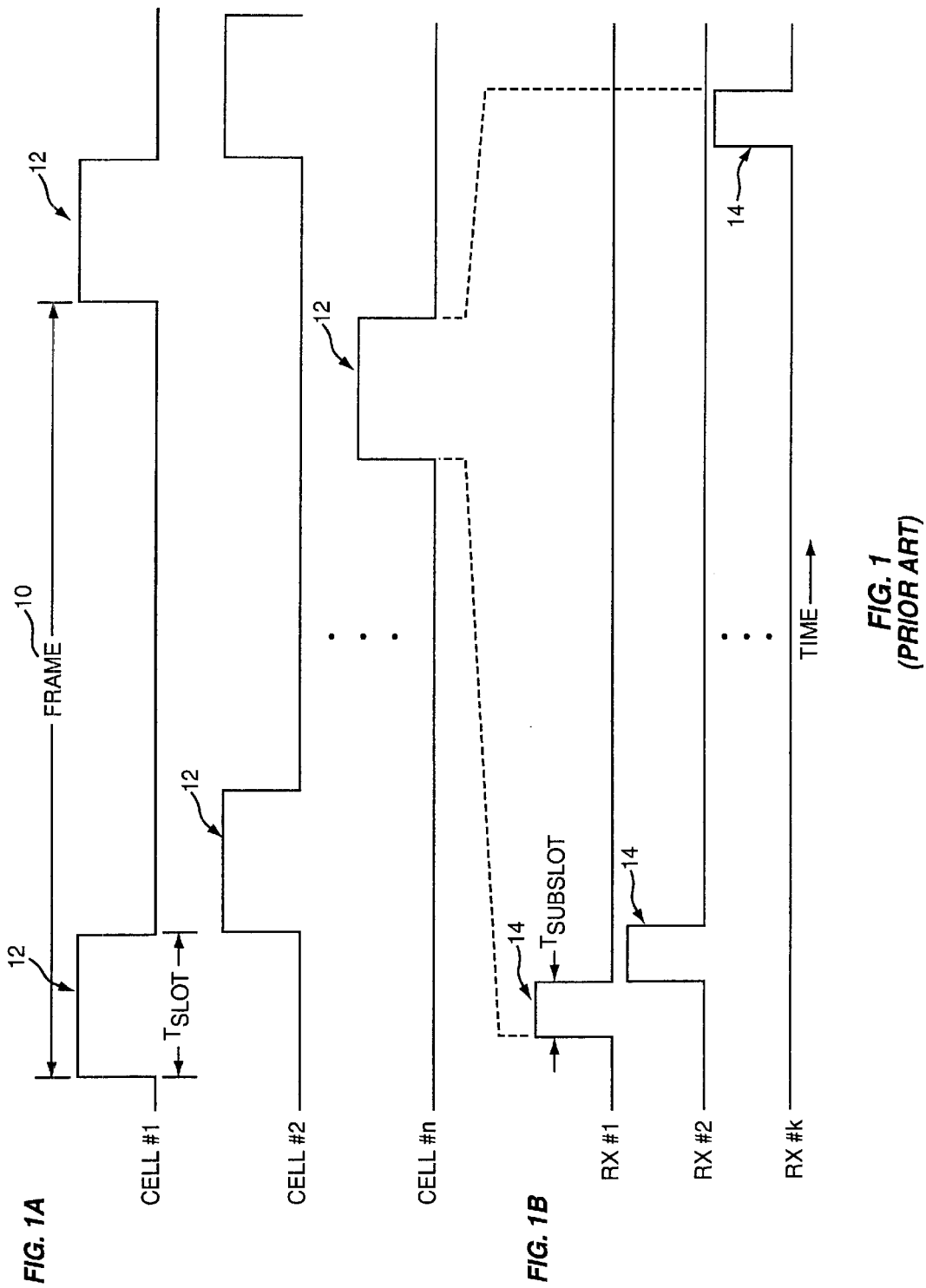
FIGS. 1a–b illustrate timing diagrams depicting the relationship between a frame, a slot and a subslot in a synchronous TDM system.
Figure 2:
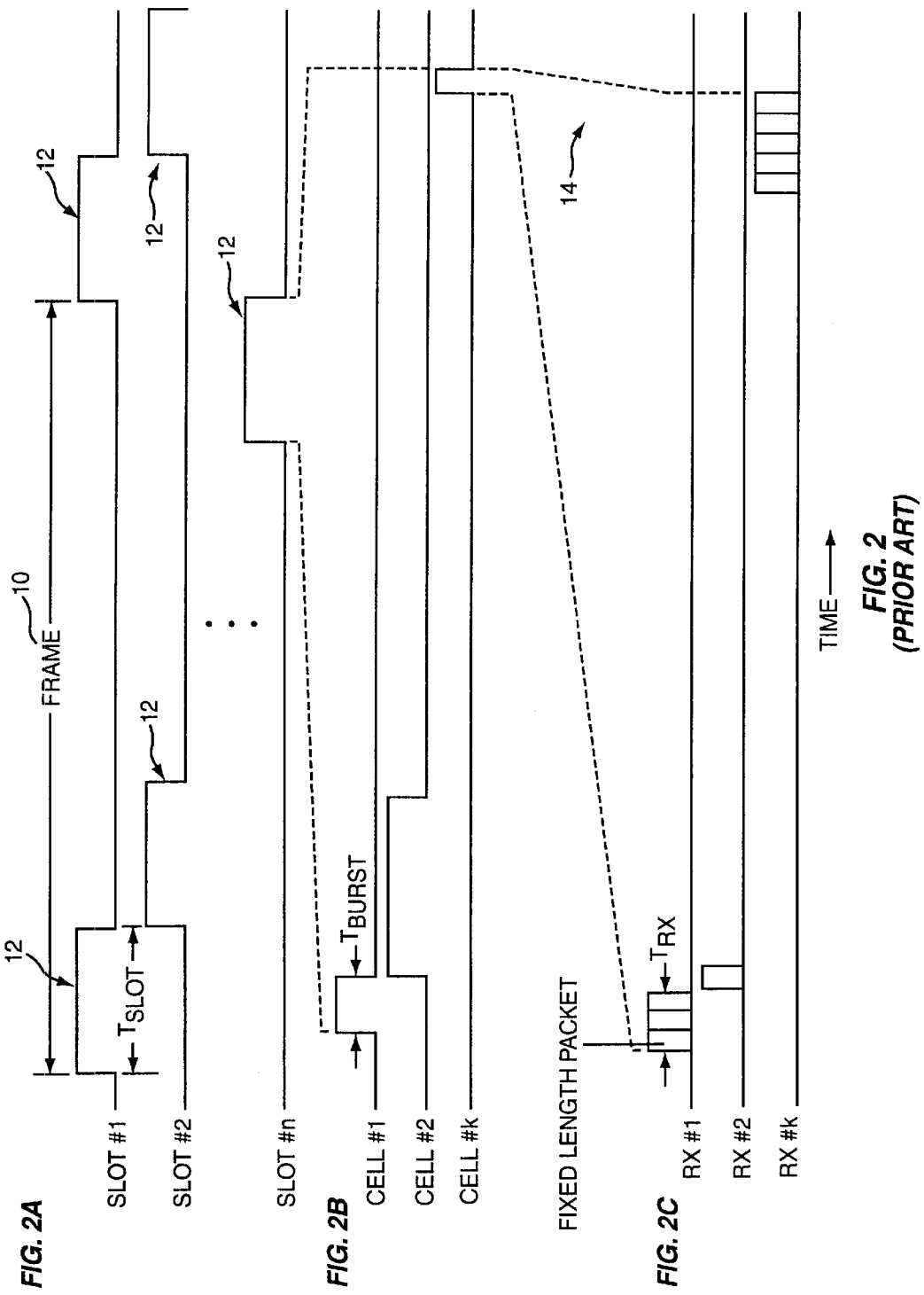
FIGS. 2a–c illustrate timing diagrams depicting the relationship between a frame, a slot and a burst in a framed ATDM system.
Figure 3:
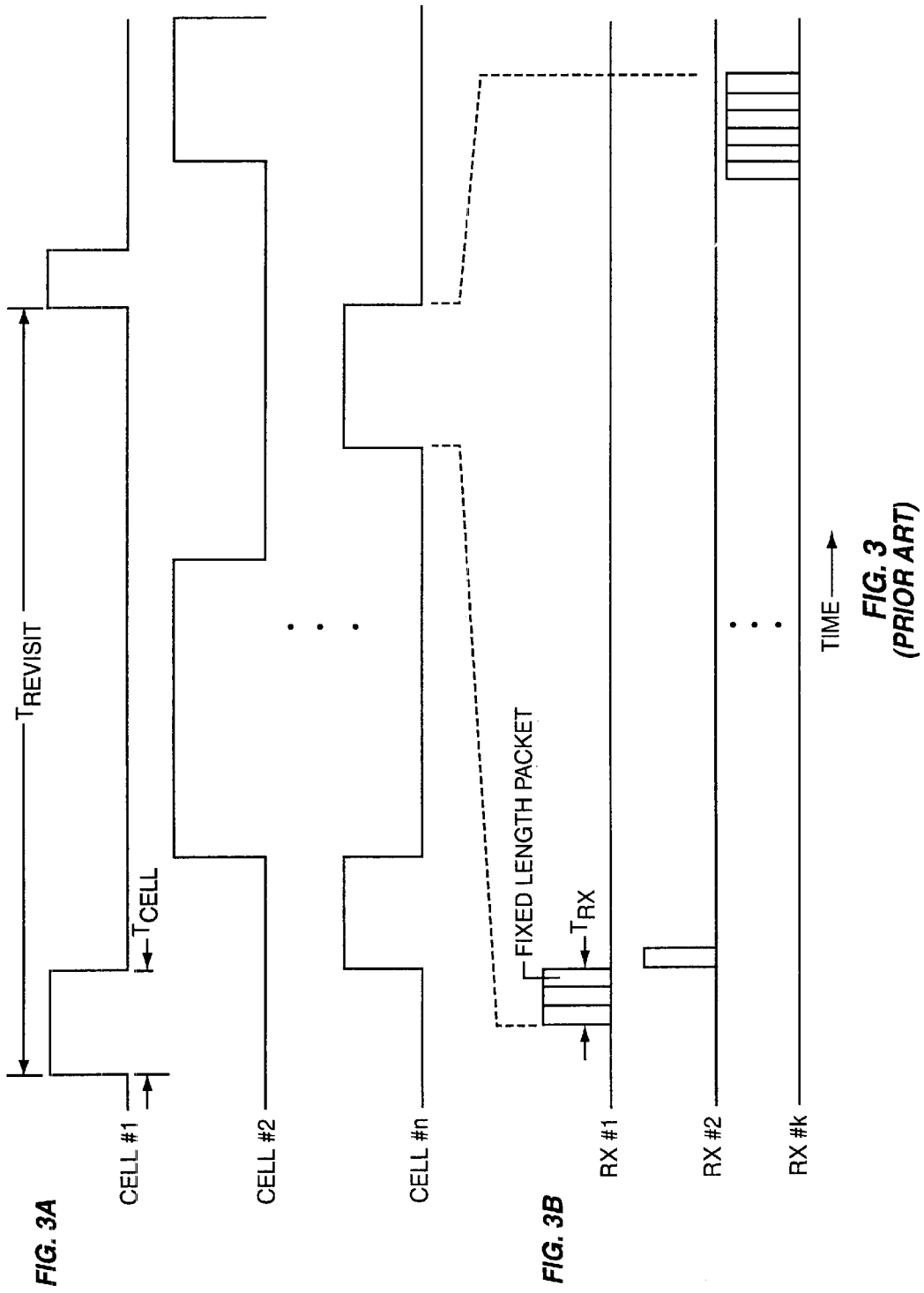
FIGS. 3a–b illustrate timing diagrams depicting the "point and shoot" access to user terminals in a frameless ATDM system.

It is advantageous from the viewpoint of achieving operational flexibility in creating capacity density peaks to utilize frameless ATDM in the downlink where all time limitations of conventional frames and slots are eliminated. This results in a point and shoot approach toward delivering downlink packets, whereby both the cell revisit time $T_{revisit}$ and the cell dwell time $T_{cell}$ of a downlink burst are random variables (see FIG. 3).

Figure 4:
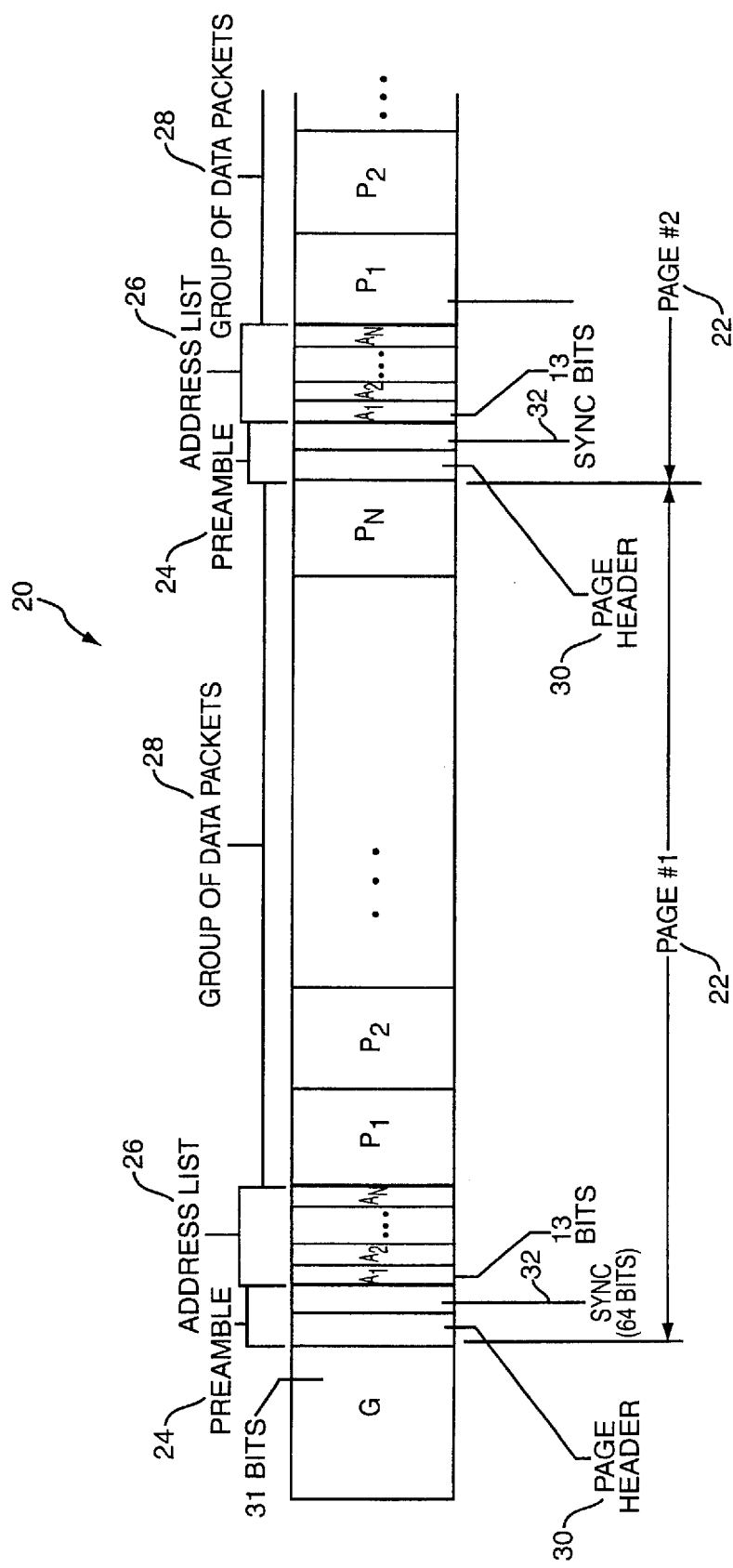
FIG. 4 illustrates a burst transmission which enables low rate demodulation in the user terminal.

FIG. 4 depicts a signal structure, commonly referred to as a burst, indicated generally as 20. The burst 20 is divided into numbered pages 22, with each page 22 including, in time sequence, a preamble 24, an address list 26 ($A_1, A_2 \ldots A_N$), and a group of data packets 28 ($P_1, P_2 \ldots P_N$). The burst 20 is transmitted, in each burst transmission, to all user terminals in a given cell, which is a region on the Earth covered by a given satellite beam.

The preamble 24 and address list 26 are configured, at the satellite, as precursors to the group of data packets 28 in each burst transmission 20 to a given user terminal. The addition of the preamble 24 and address list 26 as precursors permits a sampled-data (digital) receiver to precisely identify particular data packets $P_1, P_2 \ldots P_N$ that embody the information bits destined for the particular user terminal.

The preamble 24 informs the user terminal that the burst 20 has been received. More particularly, the preamble 24 informs the user terminal that a particular page 22 within the burst 20 has been received. The preamble 24 includes a page header 30, followed by a synchronization (sync) word 32. The page header 30 contains (a) data specifying the index of the immediately following page 22, e.g., #1, #2, #3 . . . , and (b) the number, N, of data packets 28 in the immediately following page 22.

The page header 30 is modulated onto a carrier using Multiple Frequency Shift Keying (MFSK), where each MFSK symbol is sufficiently long so as to enable low cost, e.g., analog, real time detection with high reliability. For example, each MFSK symbol may be made equal in length to 64 traffic symbols, with M, the number of frequencies in MFSK, being 8. With the length of each MFSK symbol being 64× that of a traffic symbol, the spectrum occupancy of each MFSK symbol is approximately 1/64 of that of the traffic symbol, i.e., 1/64 of the channel bandwidth. Accordingly, 64 possibilities exist for the center frequencies of the MFSK symbols.

Figure 5:
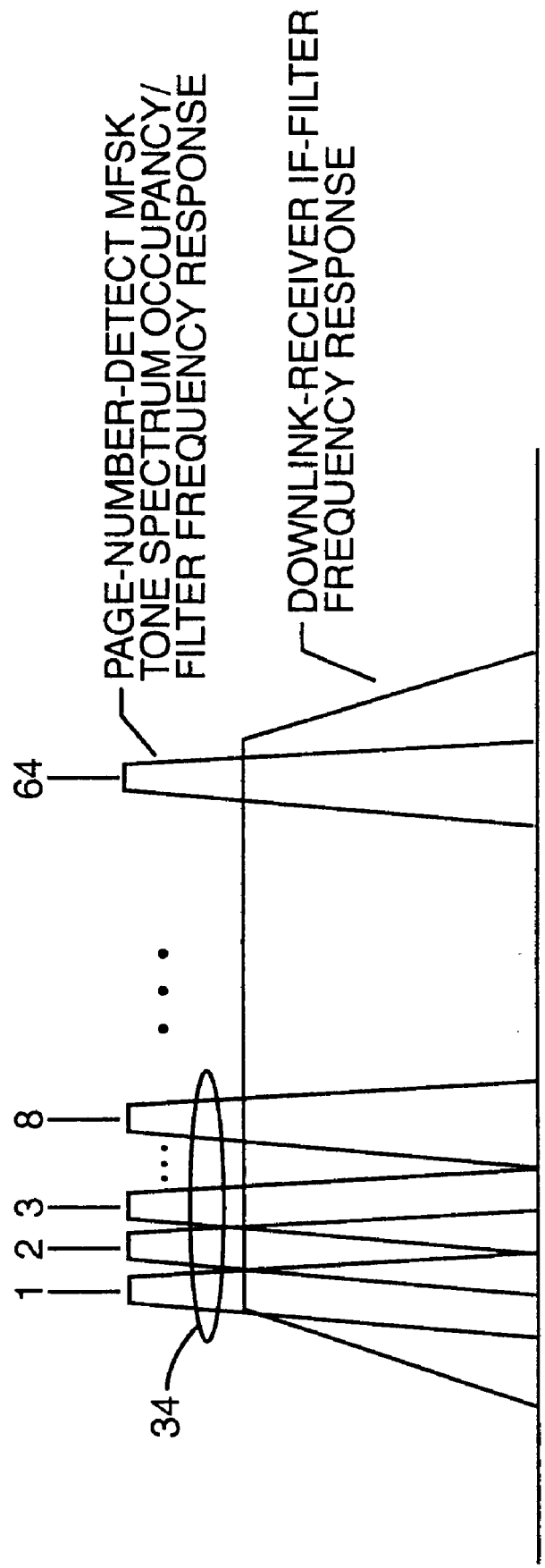
FIG. 5 illustrates the spectrum occupancy of MFSK (Multiple Frequency Shift Keying) symbols for page number detection.

As shown in FIG. 5, if the eight frequencies in 8-ary MFSK are viewed as a set, such as indicated at 34, then eight such sets can be accommodated within a single downlink channel. Any one frequency set 34 will be used for a given cell, with the other frequency sets being used in other cells according to a cellular frequency reuse plan. The availability of eight frequency sets is sufficient to construct a frequency reuse plan with adequate frequency reuse distance.

Referring back to FIG. 4, an MFSK demodulator 64 (see FIG. 8) including a set of narrow band filters and energy detectors, or page number detectors, in the user terminal (not shown) detects its own page number in the page header 30 of the preamble 24 and triggers the start of the storage of digitized signal samples in a memory at the user terminal. It should be noted that if the maximum number of pages in a burst is eight or less, than the packet number field in the page header 30 may consist of a single MFSK symbol, which is basically a pulse whose frequency identifies the page number. Thus, the page number detector can be reduced to a bandpass energy detector at an assigned center frequency corresponding to the user terminal's page number. The output of the bandpass energy detector is compared to a threshold value to indicate the receipt, or of a valid page with a number matching that of the terminal. The criterion for detecting the page number is based on a combination of energy detection and sequence matching, as described in greater detail infra. The relatively long MFSK symbols of the page header 30 (one symbol equals the length of 64 traffic symbols) maximizes the signal-to-noise ratio in a narrow band, burst-detect decision device, thereby maximizing the probability of detection and minimizing the probability of false alarm. While the page header 30 is easily detected in real time with an analog filter bank, a real time, digital MFSK demodulator may be used for detecting the page number in the page header 30 without departing from the spirit and scope of the present invention.

Up to eight pages can be represented by a single 8-ary MFSK symbol (3 bits) and 64 pages can be represented with two sequential 8-ary MFSK symbols. More than two symbols, ie., 64 pages, are unlikely to be necessary in typical applications for the page number field of the page header 30. The "number of packets" field, which is also part of the page header 30, will require additional MFSK symbols. Four symbols (3 bits per symbol), representing up to N=4,096, are likely to suffice in typical applications. Thus, the page header 30 will typically include six symbols. It is desirable to minimize the length of the page header 30 as it constitutes overhead for the transmission system. The number of MFSK symbols in the page header 30 would be fixed as a network configuration parameter and would known a priori to the user terminal.

The preamble 24 is followed by the address list 26, which consists of an ordered list of user terminal addresses $A_1$, $A_2 \ldots A_N$ corresponding to each respective data packet $P_1$, $P_2 \ldots P_N$ in the burst 20. The addresses are collected at the satellite and there is a one-to-one correspondence between the position of an address $A_1, A_2 \ldots A_N$ in the address list 26 and the position of a data packet $P_1, P_2 \ldots P_N$ in the group of data packets 28. Each address $A_1, A_2 \ldots A_N$ and each data packet $P_1, P_2 \ldots P_N$ include a fixed number of bits.

The burst 20 also includes a guard time segment G at the beginning. The guard time represents the period of time in which nothing of significance is being transmitted, allowing the beam antenna at the satellite to switch directions. The guard time G in FIG. 4, with an exemplary length of 31 bits, is provided generally to allow the transmitting equipment in the satellite to settle down and prepare for transmission.

Accordingly, a demodulator at a user terminal, i.e., receiver, receiving the burst 20, first detects for the presence of energy in the page header 30. Since each receiver within a particular cell is assigned a particular page number, and all data transmitted to that receiver is transmitted in that particular page within the burst 20, if energy is detected, the user terminal knows that the following page of information might contain data packets destined for the user terminal, it at all present in the particular burst 20. The sync word 32 is compared with a matched filter to confirm the detection of energy in the page header 30. Subsequently, the addresses $A_1, A_2 \ldots A_N$ are demodulated and processed to identify if any of the data packets $P_1, P_2 \ldots P_N$ in the transmitted burst are destined for that particular user terminal. After the address list 26 is demodulated and processed, the demodulator selectively demodulates only those data packets identified as intended for the user terminal.

For example, assume sixteen data packets (N=16) are transmitted in a corresponding page 22 within the burst 20, with particular data packets $P_1$–$P_3$ and $P_9$ including information bits destined for the receiving user terminal. After processing the preamble 24 to detect and confirm that the page 22 has arrived, the addresses $A_1, A_2 \ldots A_{16}$ are processed and data packets $P_1$–$P_3$ and $P_9$ are identified as being destined for the receiving user terminal. More specifically, the demodulator demodulates addresses $A_1$, $A_2 \ldots A_{16}$ and detects that addresses $A_1$–$A_3$ and $A_9$ match the receiving user terminal address. The demodulator then demodulates only data packets $P_1$–$P_3$ and $P_9$, ignoring data packets $P_4$–$P_8$ and $P_{10}$–$P_{16}$.

In the continuous time domain, the above-described method is equivalent to identifying the continuous time segments in a received burst that embody the information bits destined for a particular user terminal. The user terminal need only demodulate relatively few additional bits over and above the bits that constitute its own data packets. This reduces the demodulation rate of the user terminal to a level close to that of its own packet data rate. Further, the number of bits dedicated to the address of an individual user terminal is generally a small fraction of the number of bits in the entire burst transmission; with a typical fraction being 3%. Thus, the demodulator need only demodulate 3% of the received burst transmission 20, plus whatever number of bits make up the data packets $P_1, P_2 \ldots P_N$ destined to the particular user terminal; considerably less than the entire burst transmission 20.

Further, it is not necessary to demodulate every bit in each of the addresses $A_1, A_2 \ldots A_N$. If it is assumed that "0" and "1" occur equally at the first address bit, then presumably fifty-percent (50%) of the time only the first bit of an address needs to be demodulated. Fifty-percent of the time the first bit of the address will not match the first bit of the user terminal address, and the demodulator can disregard the remaining bits and move on to the next address. The same holds true for the second, third, fourth, etc., bits of the addresses $A_1, A_2 \ldots A_N$.

While the addresses $A_1, A_2 \ldots A_N$ and data packets $P_1, P_2 \ldots P_N$ have been described above as having a one-to-one correspondence, an alternate address list construction wherein a plurality of data packets for the same user terminal are grouped in a continuous sequence may be utilized without departing from the spirit and scope of the present invention. In this alternative scheme, the number of entries $A_1, A_2 \ldots A_M$ in the address list 26 would be less than the number of data packets $P_1, P_2 \ldots P_N$ in the group of data packets 28, with each address list entry $A_1, A_2 \ldots A_M$ corresponding to a contiguous sequence of n data packets $P_1, P_2 \ldots P_N$ addressed to the same user terminal. Each address list entry $A_1, A_2 \ldots A_M$ would be required to have two fields, an address field and a "number of contiguous data packets equals n" field. There could be several address list entries for the same user terminal owing to the presence of several, non-contiguous data packets addressed to the same user terminal. It is not required in this alternative scheme for the satellite payload to enforce contiguity among all data packets $P_1, P_2 \ldots P_N$ addressed to a single user terminal, as this would increase the necessary payload complexity of the satellite. While this alternative scheme requires more user terminal processing, it offers a potential reduction of the transmission overhead contributed by the address list 26, particularly when the burst 20 is dominated by transmission to a few users.

When data is transmitted using both error correction coding and modulation, demodulation will have to be performed for all address bits followed by decoding. However, error correction decoding may be terminated as soon as it is evident that it will not produce the receiving user terminal's addresses, eg., when no state of a Viterbi decoder contains a bit pattern matching the receiving user terminal's address. This will reduce the processing speed requirement of the user terminal.

The storage of digitized signal samples is started when both of the following conditions are met: (a) a sequence of pulses of sufficient energy, relative to a given threshold level, is detected out of the MFSK matched filters with the correct time separation between the pulses, the time separation being approximately equal to the page header 30 symbol period plus or minus some tolerance owing to additive noise, indicating the receipt of valid page header; and (b) the data in the page number field of the page header 30 indicates that the received page number matches that of the receiving terminal. Various circuit techniques utilizing digital logic gates can be implemented for verifying the receipt of an authentic page header. For example, the time separation between pulses may be determined by conventional digital counter techniques, while exclusive-OR logic gates may be utilized to indicate the absence of simultaneous outputs from the multiple MFSK filters.

The first symbol of the sync word 32 is expected to arrive based on the start of, and the known length of, the page header 30. This storage of digitized signal samples is stopped when any other valid page header is received, regardless of its data. Accordingly, a user terminal set to page #1, will start storing digitized signals upon receipt of the page header 30 at the beginning of page #1, and will terminate upon the receipt/detection of the page header 30 at the beginning of page #2, i.e., the start of the next consecutive page. For the last page, the page header is repeated at the end of the group of data packets 28, terminating the storage of digitized signal samples in the last page.

It is noteworthy that not all pages 22 need to be transmitted; only pages containing traffic will be downloaded. This helps to reduce the overhead consumed in the page header 30 and sync word 32. By virtue of paging, the number of data packets, N, in a page 22 is upper bounded to a maximum value, $N_{max}$. Accordingly, a memory at the receiver must be sized to accommodate up to $N_{max}$ data packets. The upper limit $N_{max}$ is enforced as follows. Low data rate terminals, i.e., terminals with a low data demodulation rate, with a specified peak receive data rate such as 2 Mbits/sec, resident in a given cell, are grouped together in common pages, numbered such as #1, #2, #3, etc. Then, based on the definition of peak receive data rate, as will be explained below, the number of packets in a given page 22 can be guaranteed to be less than some maximum limit. Typically, such a limit might corresponding to 2 Mbytes of signal storage.

The peak data rate is defined as the maximum mean data rate when averaged over several accesses. Transmissions to a terminal with a specified peak receive data rate ($R_{max}$) are subject to the following limitations: (a) the terminal cannot be sent more than a maximum number, J, of packets 28 in a given burst 20, and (b) once a terminal has received K packets 28 in a burst 20, it cannot be sent another burst 20 containing a packet addressed to that terminal before $T_r$ seconds. Both of the above restrictions are consistent with the definition of peak data rate. The relationship between the above parameters are as follows.

Let $R_c$ be the bearer data rate. This is the burst information rate of the downlink and is usually time invariant. Typically, in a broadband multimedia satellite communication system, $R_c$ might be 450 Mbits/sec. The parameter J can be decided somewhat arbitrarily for a given system and depends on the average burst length, $T_{burst}$, and the average cell revisit time, $T_{revisit}$, when a terminal is receiving data at the mean rate of $R_{max}$. If the packet length be fixed to be P bits, with a typical value of P being 1024 bits, then the number of bits in an average burst when receiving at peak rate is equal to (J)(P) bits. The burst rate to a given terminal measured over one burst, $R_{burst}$, would be $(J)(P)/T_{burst}$. It follows then that $R_{max}=(R_{burst})(T_{burst}/T_{revisit})=(J)(P)/T_{revisit}$. Therefore, the maximum number of packets transmittable in a given burst, J, is equal to $(R_{max})(T_{revisit})/P$.

Typically, $T_{revisit}$ might be 4 milliseconds. If $R_{max}$ equals 2 Mbits/sec, this sets (J)(P) equal to 8 kbits, which sets J (the max number of packets transmittable to a terminal in a given burst) equal to approximately 8 packets. Considering that $T_{burst}$ and $T_{revisit}$ are "average" metrics over random distributions, and allowing for a margin factor of 2 to accommodate lightly loaded cells with longer revisit times, J can be upper bounded to approximately 16. If J is increased, the revisit time $T_{revisit}$ must be increased proportionately as the limit on $R_{max}$ cannot be exceeded. Thus, in the operational scenario described above, no more than 16 1-kbyte packets 28 can be transmitted once per every 8 milliseconds ($T_{revisit}$) to a terminal whose peak data rate is specified as 2 Mbits/sec.

If J packets 28 are received in a burst 20, no more can be sent to the terminal for $T_{revisit}$ seconds without violating the $R_{max}$ specification. However, if less than J packets, say K packets, are sent in a burst 20, then the minimum revisit time, $T_r$, can be proportionally shortened to $T_r=(T_{revisit})(K/J)$. The above describes the restrictions of a maximum number of packets 28 transmittable in a burst 20 and the minimum revisit time for a terminal of specified peak data rate.

As the maximum number of packets 28 that can be transmitted to a particular low data rate terminal in a given burst 20 is limited to J, up to $N_T$ low data rate terminals can be grouped together on a page 22, with an upper limit of $N_{max}=N_TJ$ packets in the page 22. Although this would be the worst case with respect to the number of packets 28 per page 22, it is unlikely that all terminals in a page 22 will be receiving at the peak data rate simultaneously. This means that $N_T$ could be increased by some trunking factor based on the traffic model.

Based on the above discussion, the maximum signal memory that needs to be carried in each low data rate terminal in the page 22 is limited to $N_TJP$ bits. Given that 2 Mbytes of memory can be economically carried in a low cost terminal, and assuming that the A/D resolution, $n_{A/D}$, is 4 bits per I and Q sample, $N_T$ and $N_{max}$ are given by:

$N_T$ = memory size [in bits]/$(JPn_{A/D})(I/Q$ doubling factor)

$= 16E6/(16)(1E3)(4)(2)$ $= 125$ terminals per page $N_{max} = N_TJ$ $= 125 \times 16$ $= 2000$ packets per page.

The above description illustrates, for exemplary purposes only, how to group low data rate terminals in a page, subject to a maximum signal memory size in the terminals.

Figure 6:
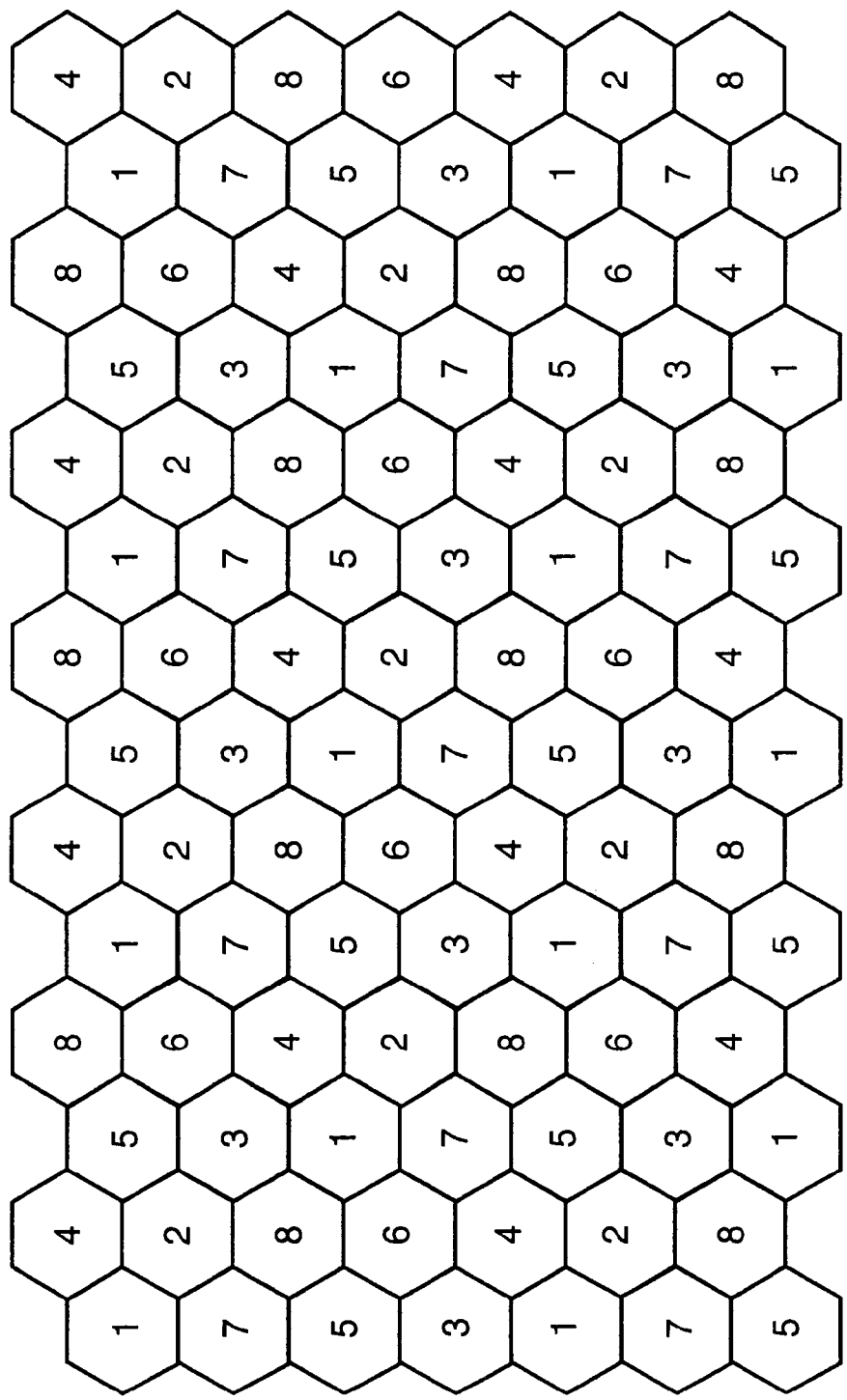
FIG. 6 illustrates an exemplary frequency reuse scheme for the 8-ary MFSK of the present invention.

In frameless point and shoot downlink ATDM transmission, there exists a potential for adjacent cell interference. Since there are no slots, subsequent downlink bursts can be directed at cells that are arbitrarily close. This is due to the fact that a terminal's aperture in frameless ATDM systems is always open, except as restricted by the minimum revisit time for terminals of specified peak data rate. Thus, there is a risk of error, arising from adjacent cell interference, in the detection of the start-of-burst and end-of-burst page number. Assigning each cell an MFSK signal set different from those of its immediately adjacent neighbors mitigates this risk. The MFSK signal set can be reused at cells situated as some minimum distance according to a frequency reuse scheme. An exemplary frequency reuse scheme for the 8-ary MFSK of the present invention is illustrated in FIG. 6. Other reuse schemes may be utilized.

In frameless ATDM supporting a point-and-shoot packet delivery scheme, subsequent bursts 20 to a given cell can occur with arbitrary closeness in time, subject to restrictions in the packet discharge algorithm in the satellite. A worst case scenario exists where a number of separate, single-page bursts are downlinked to a given cell back-to-back. In this scenario, the particular terminal receiver of interest must perform sync word matched filtering and address preamble demodulation for each page 22 within the time span of one page. If this is not accomplished, the signal storage memory at the terminal will be overwritten.

FIGS. 7a–i illustrate demodulator timing diagrams for frameless ATDM. FIG. 7a illustrates the burst access to a given cell. As previously stated, the start 40 and end 42 times of the dwell are random. FIG. 7b illustrates a page 22 to a particular receiver, the page 22 being a subset of the access to the cell. FIG. 7c illustrates, with impulses, the event representing detection of a receiver's own page. Upon detection, as shown in FIG. 7d, the digitized samples corresponding to the sync word 32 and address list 26 are received and written to a preamble memory. The lengths of the sync word 32 and address list 26 are known to the receiver a priori, both the sync word 32 and address list 26 being of known lengths. The length of the sync word 32 is fixed by the system design (shown in the example of FIG. 4 to be 64 bits), while the length of the address list 26 is known from the number of packets, N, carried in the second field of the page header 30 and the fixed length of the address field per packet (shown to be 13 bits in the example of FIG. 4). Knowledge of this length, (N×13)+64 bits in the example of FIG. 4, allows the receiver to terminate the write to preamble memory at a precisely known instant and start writing input data samples to the data memory as illustrated in FIGS. 7d–e.

Figure 7:
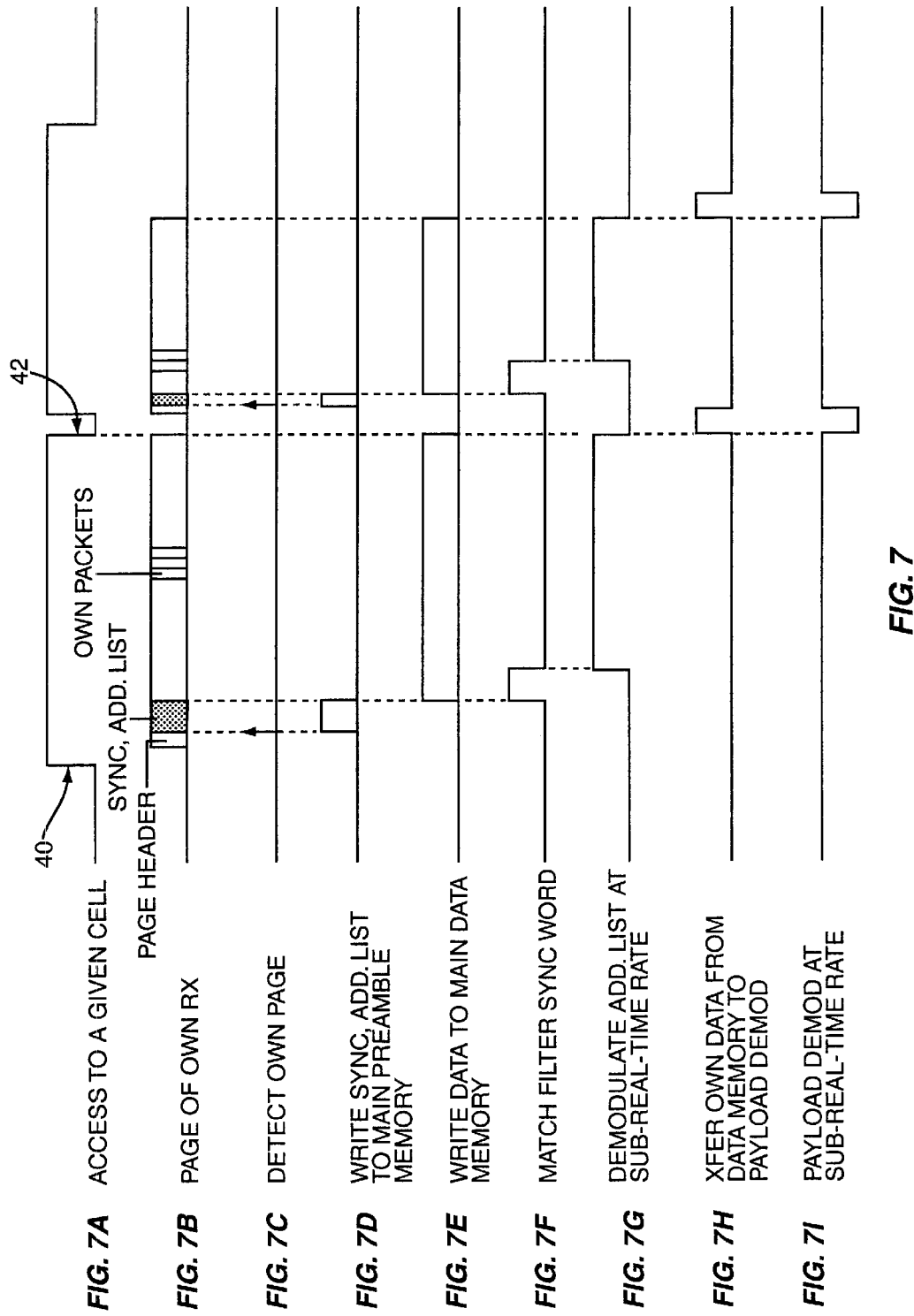
FIGS. 7a–i illustrate timing diagrams for demodulation of a received burst transmission by the demodulator functional architecture of FIG. 8.

Once the write to data memory starts (FIG. 7e), the preamble memory is available to be read out and the samples demodulated. FIGS. 7f–g illustrate processing of the sync word 32 and the address list 26. Although this processing can be executed at a sub-real-time rate, as shown in FIG. 7, the processing speed must be sufficient that the processing of the sync word 32 and the address list 26 are completed within the time span of the particular page 22. If the processing speed is insufficient, then the possibility exists of preamble memory being overwritten by a subsequent access. FIG. 7h illustrates the transfer of payload data packets out of the data memory into the local (cache) memory of the data demodulator processing module. The transferred payload packets resident in the local memory of the data demodulator are then demodulated in sub-real-time as illustrated in FIG. 7i. It is noteworthy that the terminal's aperture is always open. "Aperture open" means that the terminal is ready to receive and process the preamble 24 and address list 26 of the burst 20.

An estimate of the typical processing speed for the address detect processor is provided below. As previously noted, matched filtering of the exemplary 64 sync bits and demodulation of the exemplary (N×13) address bits, where N is the number of data packets in a page, must be performed in a time span of one page. When the number of data packets in a page are large, e.g., several tens, the time taken to demodulate the address list 26 predominates over the time taken to perform matched filtering of the sync word 32 (64 bits). If this is the case, the ratio of the required processing speed to bearer data rate is approximately the same as the ratio of the number of address bits to the number of payload, or packet, bits. Noting that, in the present example, the number of payload bits is 1024 and the bearer information rate is 450 Mbits/sec, the required processing speed is given by the following formula:

$$\text{Required Processing Speed} = (\text{bearer rate})(\text{\# of address bits})/(\text{\# of packet bits})$$

$$= (450)(13)/(1024)$$

$$= 5.7 \text{ Mbits/sec.}$$

It is assumed in the above example that the level of Forward Error Correction (FEC) coding applied to the address list 26 is similar to that of the payload packets. Hence, the ratio of the time occupancies of the address lists and the payload packets, as utilized in the above equation, are unaffected by the use of FEC. If the levels of FEC coding are different, then the required processing speed will need to be adjusted according to the ratio of the coding rates.

For a low cost, low power dissipation terminal, 5.7 Mbits/sec is a reasonable processing speed requirement. A higher processing speed must be allowed for if the number of packets in a page is very low, e.g., under five, since the time for matched filtering of the sync word 32 becomes comparable to the demodulation time of the address list 26. However, consecutive low-packet-count single-page bursts to a given cell are unlikely and can be avoided by suitably designing the packet discharge algorithm in the satellite. For example, packets can be held in queuing buffers in the satellite until: (a) the queues build to a certain length; or (b) the waiting time exceeds a preset value. In both cases, the worse case scenario of consecutive low-packet-count single-page bursts to a given cell is avoided.

Figure 8:
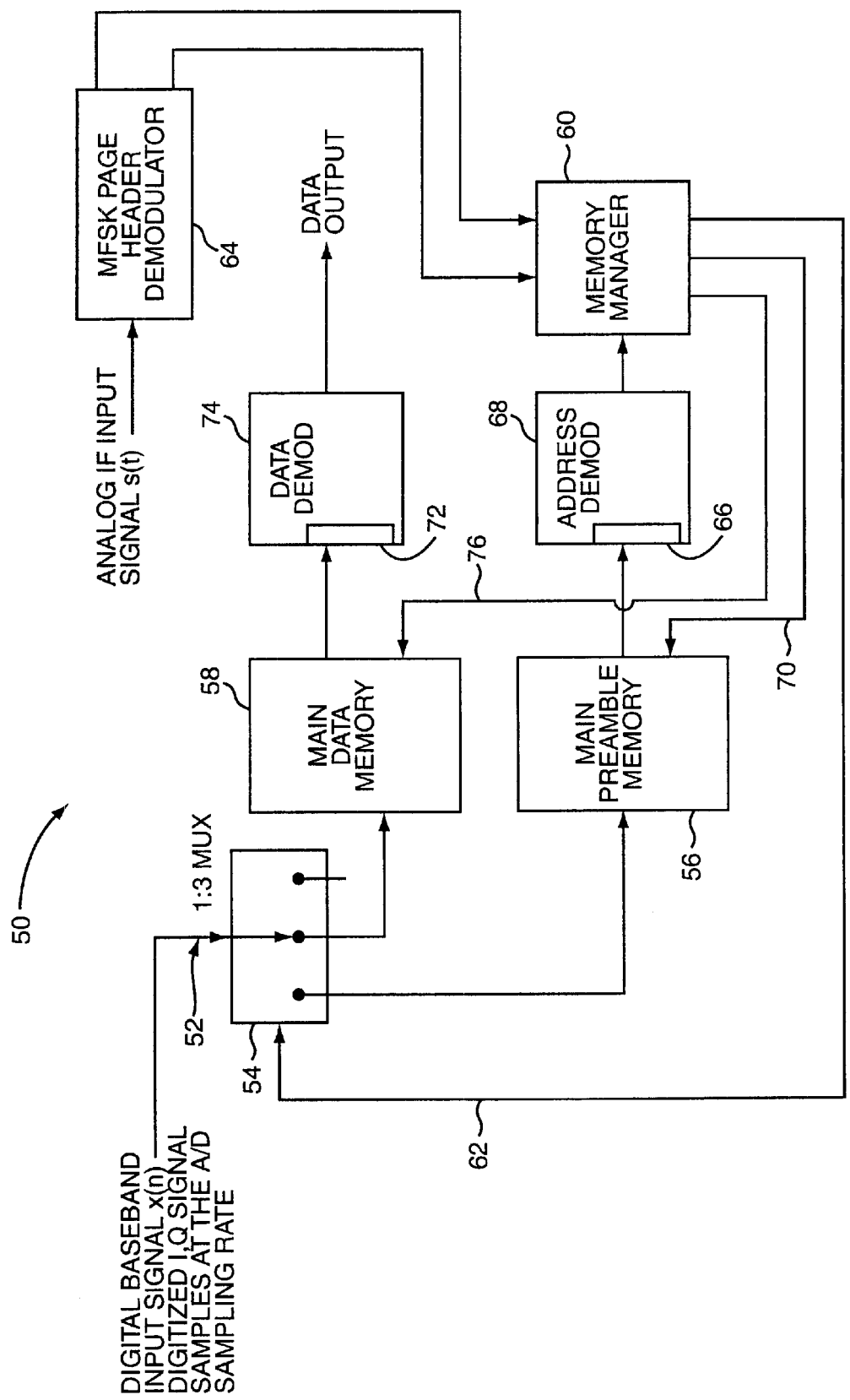
FIG. 8 is a block diagram of the functional architecture of a demodulator which enables low rate demodulation at the user terminal.

FIG. 8 illustrates a top level block diagram of a demodulator, indicated generally as 50, for demodulating a received burst 20 based on the above-described method. The burst 20 is indicated as a traffic signal x(n), is transmitted from an A/D subsystem (not shown), and received by the demodulator at 52. The traffic signal x(n) carries sampled data at an exemplary rate of 450 Mbytes/sec, assuming one sample per input symbol and individual 4-bit A/D converters (not shown) for the I and Q signals.

The traffic signal x(n) is received by a multiplexer 54, of the exemplary ratio 1:3. The sync word 32 and address list 26 are written to a main preamble memory 56, and the data packets 28 are written to a main data memory 58, under the control of a memory manager 60 via a write gate control signal 62.

From the page header demodulator 64, which receives the page header 30 as an analog IF input signal s(t), the memory manager 60 obtains timing information regarding the start of the burst 20, the receipt of a matching page number and the number of data packets in the page 22. This allows the memory manager 60 to determine the start and stop times of the write and read to/from the main memories 56 and 58. Only if the page number in the received burst matches the page number assigned to the terminal will data be stored in main memories 56 and 58.

After the sync word 32 and address list 26 are stored in the preamble memory 56, they are read to a local memory 66 of an address demodulator 68, enabled by read gate control signal 70 from the memory manager 60. The sync word 32 is matched filtered in non-real time as a first task before non-real time demodulation of the address list 26, using the processing resources of the address demodulator 68. At the same time, the data packets 28 are being read to the data memory 58. The sync word 32 may also be matched filtered in real time by the page header demodulator 64.

From the address demodulator 68, an address list is obtained, which is fed to the memory manager 60. The memory manager 60 decides if any packets destined to the receiving user terminal are present and, if so, their locations in the main data memory 58. The particular data packets are read from the main data memory 58 to a local memory 72 of a data demodulator 74, enabled by read gate control signal 76 from the memory manager 60. An exemplary data demodulation rate for the data demodulator 74 is 2 Mbits/sec, while an exemplary demodulation rate for the address demodulator 68 is 5.7 Mbits/sec, as previously shown.

It should be noted that the above description has been based on separate main preamble 56 and data 58 memories because, with low complexity, low cost, memory modules, simultaneous read and write is not possible. However, by using more complex dual port memory modules, it is possible to have simultaneous read and write, albeit to different memory locations. Using such memory modules, it is possible to merge the two main memories into one.

While the invention has been described with particular reference to the drawings, it should be understood that various modifications could be made without departing from the spirit and scope of the present invention.

What is claimed is:

1. A method of demodulating a communication signal comprising the steps of:

receiving the communication signal at a user terminal, the communication signal including a plurality of pages, each page having a plurality of addresses and corresponding data packets;

identifying which of the plurality of pages are destined to the receiving user terminal;

identifying which of the plurality of data packets within the identified page are destined to the receiving user terminal; and demodulating only the data packets identified as being destined to the receiving user terminal;

wherein the communication signal is transmitted at a first rate, and wherein the data packets identified as being destined to the receiving user terminal are demodulated at a second rate less than the first rate.

2. The demodulating method of claim 1, wherein each of the plurality of pages is preceded by a page header indicative of page number, and wherein the step of identifying which of the plurality of pages are destined to the receiving user terminal comprises the step of detecting which of the plurality of page numbers, corresponding to the plurality of pages, matches a page number assigned to the receiving user terminal.

3. The demodulating method of claim 2, wherein the page header comprises an MFSK (Multiple Frequency Shift Keying) signal having a plurality of center frequencies defined by a single symbol, each page number represented by a unique center frequency, wherein the step of detecting which of the plurality of page numbers, corresponding to the plurality of pages, matches the receiving user terminal page number comprises the steps of:

filtering the communication signal using a narrow bandpass filter having a center frequency corresponding to the unique center frequency of the receiving user terminal page number; and detecting energy output by the filter and comparing the detected energy to a threshold value.

4. The demodulating method of claim 2, wherein the page header comprises an MFSK (Multiple Frequency Shift Keying) signal having a plurality of center frequencies defined by a plurality of symbols, each page number represented by a unique sequence of the plurality of symbols, wherein the step of detecting which of the plurality of page numbers, corresponding to the plurality of pages, matches the receiving user terminal page number comprises the steps of:

filtering the communication signal using a plurality of narrow bandpass filters each having a center frequency corresponding to one of the center frequencies in the MFSK signal;

detecting energy out of each filter and comparing the detected energy to a threshold value;

comparing time separations between the received MFSK symbols and comparing the time separations to a given nominal value, wherein sequences of MFSK symbols of energy exceeding the threshold value and time separations less than the given nominal value define a received page number word; and comparing the received page number word with a known reference word representing the page number of the receiving user terminal.

5. The demodulating method of claim 1, wherein the step of identifying which of the plurality of data packets within the identified page are destined to the receiving user terminal comprises the steps of:

demodulating the plurality of addresses in the identified page; and detecting which of the plurality of addresses within the identified page matches the receiving user terminal address.

6. The demodulating method of claim 5, further comprising the steps of:

writing the identified page to a memory in the receiving user terminal; and reading the identified page from the memory for demodulation.

7. The demodulating method of claim 6, wherein the step of writing the identified page to a memory in the receiving user terminal comprises the steps of:

writing the plurality of addresses in the identified page to a first memory in the receiving user terminal; and writing the plurality of data packets in the identified page to a second memory in the receiving user terminal, wherein the plurality of addresses in the identified page and the data packets identified as being destined to the receiving user terminal are read out of the first and second memories, respectfully, for demodulation.

8. The demodulating method of claim 5, wherein the communication signal is transmitted at a first rate, the data packets identified as being destined to the receiving user terminal are demodulated at a second rate, and the plurality of addresses in the identified page are demodulated at a third rate less than the first rate but greater than the second rate.

9. The demodulating method of claim 1, wherein the first rate is approximately 450 Mbits/sec.

10. The demodulating method of claim 1, wherein the second rate is approximately 2 Mbits/sec.

11. The demodulating method of claim 8, wherein the third rate is approximately 5.7 Mbits/sec.

12. A method of demodulating a communication signal comprising the steps of:

receiving the communication signal at a user terminal, the communication signal including a plurality of pages, each page having a plurality of addresses and corresponding data packets;

identifying which of the plurality of pages are designed to the receiving user terminal;

identifying which of the plurality of data packets within the identified page are destined to the receiving user terminal; and demodulating only the data packets identified as being destined to the receiving user terminal;

wherein the communication signal is transmitted from an earth-orbiting satellite.

13. A method of demodulating a communication signal comprising the steps of:

receiving the communication signal at a user terminal, the communication signal including a plurality of pages, each page having a plurality of addresses and corresponding data packets;

identifying which of the plurality of pages are designed to the receiving user terminal;

identifying which of the plurality of data packets within the identified page are destined to the receiving user terminal; and demodulating only the data packets identified as being destined to the receiving user terminal;

wherein the communication signal comprises an ATDM (Asynchronous Time Division Multiplexed) signal.

14. The demodulating method of claim 1, wherein the plurality of addresses and corresponding data packets are arranged by grouping the plurality of addresses together followed by the plurality of data packets.

15. The demodulating method of claim 14, wherein the plurality of addresses and corresponding data packets have a one-to-one correspondence.

16. The demodulating method of claim 1, wherein user terminals having low data demodulation rates are grouped into common pages.

17. A method of demodulating a communication signal received at a user terminal, the communication signal including a plurality of pages, each page having a preamble having a page header indicative of page number followed by a synchronization word, and a plurality of addresses and corresponding data packets, said demodulating method comprising the steps of:

identifying which of the plurality of pages are destined to the receiving user terminal;

comparing the synchronization word with a matched filter at the receiving user terminal to confirm page identification;

identifying, upon confirmation of page identification, which of the plurality of data packets within the identified page are destined to the receiving user terminal; and demodulating only the data packets identified as being destined to the receiving user terminal;

wherein user terminals having low data demodulation rates are grouped into common pages.

18. The demodulating method of claim 17, wherein the step of identifying which of the plurality of pages are destined to the receiving user terminal comprises the step of determining which of the plurality of page numbers matches a page number assigned to the receiving user terminal.

19. The demodulating method of claim 17, wherein the page header comprises an analog signal, and wherein the step of identifying which of the plurality of pages are destined to the receiving user terminal comprises the step of detecting a presence of energy in the page header of the preamble, said detection of energy indicating identification of a page destined to the receiving user terminal.

20. The demodulating method of claim 19, wherein the step of detecting a presence of energy in the page header of the preamble comprises the step of filtering the communication signal using a narrow bandpass filter.

21. The demodulating method of claim 17, wherein the page header comprises an MFSK (Multiple Frequency Shift Keying) signal having a plurality of center frequencies defined by a single symbol, each page number represented by a unique center frequency, wherein the step of identifying which of the plurality of pages are destined to the receiving user terminal comprises the step of:

filtering the communication signal using a narrow bandpass filter having a center frequency corresponding to the unique center frequency of the receiving user terminal page number; and detecting energy output by the filter and comparing the detected energy to a threshold value.

22. The demodulating method of claim 17, wherein the page header comprises an MFSK (Multiple Frequency Shift Keying) signal having a plurality of center frequencies defined by a plurality of symbols, each page number represented by a unique sequence of the plurality of symbols, wherein the step of detecting which of the plurality of page numbers, corresponding to the plurality of pages, matches the receiving user terminal page number comprises the steps of:

filtering the communication signal using a plurality of narrow bandpass filters each having a center frequency corresponding to one of the center frequencies in the MFSK signal;

detecting energy out of each filter and comparing the detected energy to a threshold value;

comparing time separations between the received MFSK symbols and comparing the time separations to a given nominal value, wherein sequences of MFSK symbols of energy exceeding the threshold value and time separations less than the given nominal value define a received page number word; and comparing the received page number word with a known reference word representing the page number of the receiving user terminal.

23. The demodulating method of claim 17, wherein the step of identifying which of the plurality of data packets within the identified page are destined to the receiving user terminal comprises the steps of:

demodulating the plurality of addresses in the identified page; and detecting which of the plurality of addresses within the identified page matches the receiving user terminal address.

24. The demodulating method of claim 23, further comprising the steps of:

writing the identified page to a memory in the receiving user terminal; and reading the identified page from the memory for demodulation.

25. The demodulating method of claim 24, wherein the step of writing the identified page to a memory in the receiving user terminal comprises the steps of:

writing the synchronization word and the plurality of addresses in the identified page to a first memory in the receiving user terminal; and writing the plurality of data packets in the identified page to a second memory in the receiving user terminal, wherein the synchronization word and the plurality of addresses in the identified page and the data packets identified as being destined to the receiving user terminal are read out of the first and second memories, respectfully, for matched filtering and demodulation.

26. The demodulating method of claim 23, wherein the communication signal is received at the user terminal at a first rate, the data packets identified as being destined to the receiving user terminal are demodulated at a second rate, and the plurality of addresses in the identified page are demodulated at a third rate less than the first rate but greater than the second rate.

27. The demodulating method of claim 17, wherein the communication signal is received at the user terminal at a first rate, and wherein the data packets identified as being destined to the receiving user terminal are demodulated at a second rate less than the first rate.

28. The demodulating method of claim 27, wherein the first rate is approximately 450 Mbits/sec, and the second rate is approximately 2 Mbits/sec.

29. The demodulating method of claim 28, wherein the third rate is approximately 5.7 Mbits/sec.

30. The demodulating method of claim 17, wherein the communication signal is transmitted from an Earth-orbiting satellite.

31. The demodulating method of claim 17, wherein the communication signal comprises an ATDM (Asynchronous Time Division Multiplexed) signal.

32. The demodulating method of claim 17, wherein the plurality of addresses and corresponding data packets are arranged by grouping the plurality of addresses together followed by the plurality of data packets.

33. The demodulating method of claim 17, wherein the plurality of addresses and corresponding data packets have a one-to-one correspondence.

34. A method of communicating with a user terminal comprising the steps of:

transmitting a communication signal including a plurality of pages, each page having a plurality of address and corresponding data packets;

receiving the communication signal at a user terminal;

identifying which of the plurality of pages are destined to the receiving user terminal;

identifying which of the plurality of data packets within the identified page are destined to the receiving user terminal; and demodulating only the data packets identified as being destined to the receiving user terminal;

wherein the communication signal is transmitted at a first rate, and wherein the data packets identified as being destined to the receiving user terminal are demodulated as second rate less than the first rate.

35. The communicating method of claim 34, wherein user terminals having low data demodulation rates are grouped into common pages.

36. A method of communicating with a user terminal comprising the steps of:

transmitting a communication signal at a first rate, the communication signal including a plurality of pages, each page having a preamble having a page header indicative of page number followed by a synchronization word, and a plurality of addresses and corresponding data packets;

receiving the communication signal at a user terminal at the first rate;

detecting a presence of energy in the page header of the preamble, said detection of energy indicating identification of a page destined to the receiving user terminal;

comparing the synchronization word with a matched filter at the receiving user terminal to confirm page identification;

identifying, upon confirmation of page identification, which of the plurality of data packets within the identified page are destined to the receiving user terminal; and demodulating at a second rate only the data packets identified as being destined to the receiving user terminal.

37. The communicating method of claim 36, wherein the second rate is less than the first rate.

38. The communicating method of claim 36, wherein user terminals having low data demodulation rates are grouped into common pages.

* * * * *